Patented Dec. 18, 1951 2,579,106

UNITED STATES PATENT OFFICE 2,579,106

METHOD OF PREPARING CYCLO-OCTATETRAENE

Carl E. Barnes, Pipersville, Pa., assignor to General Aniline & Film Corporation, New York, N. Y., a corporation of Delaware No Drawing. Application April 15, 1949,
Serial No. 87,824

12 Claims. (Cl. 260—666)

The present invention relates to cyclopolyolefines, and more particularly to an improved method for preparing cyclooctatetraene.

It is well known that cyclooctatetraene can be prepared by polymerizing acetylene under pressure at elevated temperatures, in the presence of certain nickel compounds which act as catalysts.

P. B. Reports 1112, 1288 and 62593, reporting on the work done by Reppe, disclose the preparation of cyclooctatetraene by the condensation of acetylene, at pressures of 10 to 20 atmospheres or higher, using nitrogen as a diluent and a neutral solvent, especially tetrahydrofurane, at temperatures from 60–70° C. and in some cases, up to 130–140° C., in the presence of nickel compounds such as nickel cyanide, nickel thiocyanate, nickel halides, or nickel acetoacetic ester. The aforesaid reports indicate that high yields of cyclooctatetraene have been obtained in this manner, accompanied by relatively small amounts of higher cyclic homologues or isomers of cyclooctatetraene, i. e., cyclodecapentaene, azulene and cyclododecahexaene.

It is well known to those familiar with the art that the reaction referred to is erratic and that high yields of cyclooctatetraene are only occasionally obtained, while at other times the yields are extremely low. It happens not infrequently that no cyclic condensation products are produced at all, even though care is taken to produce the operating conditions of a successful run.

It was believed that this erratic behavior might be due to one or several causes such as contamination by the autoclave in which the condensation was carried out, the presence of moisture in the solvent employed, and the presence of oxygen in the reaction zone. Careful investigation, however, while eliminating these possible causes, failed to improve the consistency of the yields, as illustrated by the results of the following procedure:

A glass beaker containing 10 g. of nickel cyanide is placed in a 2-liter autoclave, and after closing the autoclave, the catalyst is heated therein to 175° C. to remove the last traces of moisture, and purged five times with nitrogen at 100 p. s. i. (pounds per square inch). After cooling, 1000 g. of tetrahydrofurane (freed of oxygen by treatment with nitrogen and dried by addition of 15 g. of calcium carbide), are added under oxygen-free conditions. The resulting mixture is heated to 90° C. and the pressure adjusted with nitrogen to 70 p. s. i. Acetylene is then introduced until a pressure of 200 p. s. i. is obtained, and this pressure is maintained for 16 hours by introduction of further quantities of acetylene as required. At the end of this period, excess gas is vented, and the reaction mixture is filtered. The filtrate is subjected to fractional distillation at atmospheric pressure to recover cyclooctatetraene. The yields obtained in repeated runs employing the foregoing procedure are illustrated in the following table:

TABLE I

| Run No. | Yield in Grams of Cyclooctatetraene |
|---|---|
| 1 | 20.4 |
| 2 | 3.5 |
| 3 | 15.2 |
| 4 | 23.0 |
| 5 | 8.7 |
| 6 | 11.7 |

Manifestly, the yields thus obtained are so uncertain as to preclude adoption of the foregoing procedure for commercial production of cyclooctatetraene. Yet, adequate precautions were taken therein to avoid such causes of loss in yield as contamination of the autoclave, presence of moisture in the solvent, or presence of oxygen in the reaction zone, which were previously believed to cause the erratic yields of the reaction.

Accordingly, it was concluded that none of the conditions enumerated above was the cause of the inconsistency of the yields obtained, and that a different approach to the problem had to be made to obtain consistent yields and to provide a procedure adapted for commercial production of cyclooctatetraene.

The principal object of this invention, therefore, is to provide a method of producing cyclooctatetraene with sufficiently consistent yields to warrant adoption of the procedure for commercial purposes.

Another object of the invention is to provide a method of producing cyclooctatetraene in consistently high yields without undue complication or increased cost of operation.

Other objects, and the manner in which the same are attained, will become apparent from the description hereinafter set forth.

In accordance with this invention, cyclooctatetraene is prepared by a modification of the processes previously employed, which involved condensing acetylene, diluted with an inert gas under a total pressure of at least 10 atmospheres and especially 10–25 atmospheres, at temperatures above 50° C. and not substantially higher than 140° C., in the presence of a nickel compound catalyst and tetrahydrofurane as a solvent, the modification of this invention consisting in incorporating in the reaction mixture an anti-oxidant which is adapted to eliminate or prevent the formation of peroxides of tetrahydrofurane.

I have found that when anti-oxidants (which are likewise reducing agents), are added to the reaction mixture in sufficient amounts to inhibit formation of tetrahydrofurane peroxides and to eliminate any peroxides already present, cyclooctatetraene can be produced in consistently good yields without the difficulties encountered in the processes heretofore known.

The anti-oxidants employed in accordance with my invention include organic and inorganic compounds having reducing properties such as, for example, o- and p-polyhydric phenols, e. g. hydroquinone, tertiary butyl catechol; oxidizable secondary arylamines, e. g. diphenylamine, phenyl α-naphthylamine; aminophenols, such as p-aminophenol; neutral esters of sulfurous acid, especially lower alkyl esters such as dimethyl- and diisopropyl sulfite; and inorganic reducing agents, such as alkali metal or alkaline earth metal sulfites or iodides ($Na_2SO_3$, NaI, KI, etc.).

The anti-oxidant employed is preferably soluble in the solvent employed for the reaction, especially tetrahydrofurane, in order to afford optimum reactivity toward peroxides initially present or subsequently formed therein. When tetrahydrofurane substantially free of peroxides is initially employed, the amount of anti-oxidant required is relatively small. Thus, a concentration of 0.1% of anti-oxidant in the solvent is sufficient to provide consistent results in the preparation of cyclooctatetraene. Concentrations of from 0.05 to 1% of anti-oxidant in the solvent are, in general, effective. The anti-oxidants employed should be inert toward the other ingredients in the reaction mixture, particularly toward the nickel compound used as a catalyst.

The nickel compound catalyst employed in the process of this invention is preferably nickel cyanide or nickel thiocyanate. These compounds can be prepared by adding a soluble cyanide or thiocyanate to an aqueous solution of a nickel salt, filtering out the resulting precipitate, washing until free of water-soluble salts, drying at elevated temperature. Other nickel compounds, such as nickel chloride, nickel sulfate, the acetoacetic ester enolate of nickel, nickel hydroxide, nickel carbonate or nickel formate, are also more or less effective as catalysts, but are inferior to nickel cyanide and nickel thiocyanate mentioned above. The amount of catalyst used can vary, but in general amounts from 1 to 5% of the weight of the solvent are satisfactory.

Tetrahydrofurane, employed as the solvent, can be purified before use by treatment with a reducing agent (e. g. ferrous ammonium sulfate) to remove peroxides present therein, treatment with calcium carbide to remove moisture, and distillation in an atmosphere of inert gas such as nitrogen. Inclusion of other solvents in admixture with tetrahydrofurance, especially acetone, has been found to yield good results. However, the use of tetrahydrofurane alone is relatively convenient in that it avoids difficulties involved in mixed solvent recovery, and is accordingly preferred.

In carrying out the process, the solvent, nickel catalyst, and anti-oxidant are introduced into an autoclave, preferably together with a small amount (e. g. of the same order as the amount of catalyst) of calcium carbide which converts any residual moisture to acetylene. The autoclave is flushed with an inert gas such as nitrogen or propane, then raised to the reaction temperature within the range of 50–140° C., and a quantity of diluent gas (nitrogen or propane) is introduced under pressure in sufficient amount to prevent explosion of acetylene under the total pressure subsequently applied. For example, when nitrogen or propane are used as the diluents, the diluent gas is advantageously employed at a pressure amounting to about one-third of the total pressure used in the reaction.

Acetylene is then forced into the autoclave while maintaining the contents thereof at the reaction temperature, until the pressure rises to 10 to 25 atmospheres, and thereafter, additional quantities of acetylene are introduced to maintain the initial pressure throughout the reaction. We prefer to discontinue addition of acetylene after 14 hours, or in a few instances 28 hours, for our convenience in recovering the product, although the reaction will continue for longer periods. The autoclave is vented, the reaction mixture filtered to remove the catalyst, calcium compounds and the like, and the filtrate is subjected to fractional distillation at reduced pressure.

The following examples illustrate the preferred procedure for carrying out the preparation of cyclooctatetraene in accordance with my invention:

*Example 1*

1000 cc. of tetrahydrofurane, previously purified to remove moisture and peroxides, were placed in a 2-liter autoclave, together with 25 g. of calcium carbide, 25 g. of nickel cyanide serving as the catalyst, and 1 g. of tertiary butyl catechol, serving as an anti-oxidant. The autoclave was flushed with nitrogen, then with propane, and then heated at 90° C. Sufficient propane was then introduced under pressure to raise the pressure in the autoclave to 70 p. s. i. (absolute). While maintaining the temperature at 90° C., acetylene was fed into the autoclave until the total pressure obtained was 200 p. s. i. (absolute), and as the reaction proceeded, additional acetylene was introduced so as to maintain the pressure at the initial value of 200 p. s. i. After 14 to 16 hours, the autoclave was cooled, and the gases contained therein vented. The reaction mixture was filtered, and the filtrate subjected to fractional distillation under reduced pressure. In repeated runs employing this procedure, consistent yields of cyclooctatetraene were obtained amounting to 55–60 g.

When the same procedure was carried out repeatedly, omitting the p-tertiary butyl catechol, the yields of cyloocetatetraene varied widely from a few grams to at most 50 grams, decomposition of the distilland sometimes occurring during distillation of the reaction products.

*Example 2*

The procedure of Example 1 was repeated, except that instead of p-tertiary butyl catechol, 1 g. of diphenylamine was employed as the anti-oxidant. In repeated runs, under the conditions of this example, consistent yields of cyclooctatetraene amounting to 61–63 g. were recovered.

*Example 3*

The procedure of the foregoing examples was followed, except that instead of the anti-oxidants employed therein, 1 g. of dimethyl sulfite was added to the reaction mixture. Consistent yields of 65-75 g. of cyclooctatetraene were obtained.

Example 4

In a one gallon autoclave was placed a mixture of 2000 cc. of tetrahydrofuran (previously purified to remove moisture and peroxides), 50 g. calcium carbide, 50 g. nickel cyanide and 2 g. tertiary butyl catechol. The autoclave was flushed with nitrogen, then with propane, and then heated to 80° C. Propane and acetylene were introduced as in Example 1. After 14-16 hours, the autoclave was cooled and the reaction mixture washed up as in Example 1. In several experiments, consistent yields of 100 to 135 g. of cyclooctatetraene were obtained.

Example 5

The procedure of Example 4 was followed, except that instead of the tertiary butyl catechol employed therein, 2 g. of diphenylamine was added to the reaction mixture. Several experiments yielded consistent amounts of cyclooctatetraene in the range of 125 to 140 g.

Example 6

The procedure of Example 4 was followed, except that instead of the tertiary butyl catechol employed therein, 2 g. of dimethyl sulfite was added to the reaction mixture. Several experiments yielded consistent amounts of cyclooctatetraene in the range of 140-145 g.

Example 7

The procedure of Example 4 was repeated with diphenylamine as anti-oxidant, except that the reaction was allowed to run for 28 hours. Consistent yields of 300 to 375 g. of cyclooctatetraene were obtained.

As indicated above, other anti-oxidants can be employed in the procedure of the foregoing examples to obtain similarly consistent results insofar as yield of cyclooctatetraene is concerned. Such anti-oxidants include p-aminophenol, diisopropyl sulfite, phenyl α-naphthylamine, and alkali metal or alkaline earth sulfites or iodides ($Na_2SO_3$, $NaI$, $KI$, etc.).

Instead of nickel cyanide, nickel thiocyanate can be used as the catalyst of the foregoing examples. Other nickel salts such as the chloride sulfate, acetoacetic ester enolate, formate, carbonate, or hydroxide can be used, but lower yields of cyclooctatetraene are obtained with these catalysts.

Instead of tetrahydrofurane, a mixture thereof, e. g. with an equal volume of previously dried acetone can be used, but this procedure is less convenient since the recovery of the solvents is thereby complicated.

The proportion of diluent gas, such as nitrogen or propane, is sufficient to maintain safe operation (particularly to safeguard against explosion of acetylene) while at the same time maintaining the acetylene concentration as high as possible. Within the range of 10 to 25 atmospheres employed in accordance with this invention, a partial pressure of the diluent gas amounting to about one-third of the total pressure affords the desired safety while at the same time, optimum concenration of acetylene. Higher total pressures within the specified range are preferred in that the rate of reaction is thereby increased and the duration correspondingly decreased.

The temperature of 80-90° C. employed in the examples represents substantially the optimum temperature for the recovery of cyclooctatetraene in high yields and in relatively short reaction periods. Temperatures below 80° C. but within the range of 50-140° C. can be used, but result in a substantial decrease in the rate of reaction and a corresponding increase in the duration of the treatment. Temperatures above 90° C., but within the aforesaid range, increase the reaction rate, but also increase the proportion of by-products obtained.

In addition to the production of consistent yields of cyclooctatetraene, resulting from inclusion of anti-oxidants in the reaction mixture in accordance with the invention, a further advantage lies in the fact that the tendency of the reaction products to decompose during distillation appears to be inhibited by such amounts of the anti-oxidant as remain in the distilland.

Cyclooctatetraene prepared in accordance with this invention is useful as an intermediate in the preparation of numerous other compounds, such as phenyl acetaldehyde, terephthalic acid and suberic acid.

I claim:

1. In the method of preparing cyclooctatetraene by condensing acetylene at elevated temperature and pressure in the presence of a nickel compound catalyst, in a solvent containing tetrahydrofurane, the improvement which consists in incorporating 0.05 to 1% of an anti-oxidant in the solvent, so as to avoid the presence of tetrahydrofurane peroxide during the reaction.

2. In the method of preparing cyclooctatetraene by condensing acetylene at elevated temperature and pressure in the presence of a nickel compound catalyst, in tetrahydrofurane as the solvent, the improvement which consists in incorporating in the tetrahydrofurane 0.05 to 1% of an anti-oxidant soluble therein, so as to avoid the presence of tetrahydrofurane peroxide during the reaction.

3. In the method of preparing cyclooctatetraene by condensing acetylene at elevated temperature and pressure in the presence of a nickel compound catalyst, in a mixture of tetrahydrofurane and acetone as a solvent, the improvement which consists in incorporating 0.05 to 1% of an anti-oxidant in the solvent, so as to avoid the presence of tetrahydrofurane peroxide during the reaction.

4. In the method of preparing cyclooctatetraene by condensing acetylene at elevated temperature and pressure in the presence of a catalyst of the class consisting of nickel cyanide and nickel thiocyanate, in a solvent containing tetrahydrofurane, the improvement which consists in incorporating 0.05 to 1% of an anti-oxidant in the reaction mixture in sufficient amount to prevent the presence of tetrahydrofurane peroxide during the reaction.

5. In the method of preparing cyclooctatetraene by condensing acetylene at temperatures from 50 to 140° C. at a total pressure of 10 to 25 atmospheres in the presence of a nickel cyanide catalyst, in a solvent containing tetrahydrofurane, the improvement which consists in incorporating 0.05 to 1% of an anti-oxidant in the solvent, so as to avoid the presence of tetrahydrofurane peroxide during the reaction.

6. In the method of preparing cyclooctatetraene by condensing acetylene diluted with about one-half mol equivalent of an inert gas at a temperature of 50 to 140° C. at a total pressure of 10 to 25 atmospheres in the presence of a nickel cyanide catalyst, in tetrahydrofurane as a solvent, the improvements which consists in incorporating in the solvent 0.05 to 1% of an anti-oxidant soluble in the solvent, so as to avoid the presence of tetrahydrofurane peroxide during the reaction.

7. In the method of preparing cyclooctatetraene by condensing acetylene diluted with about one-half mol equivalent of an inert gas at a temperature of 50 to 140° C. and a total pressure of 10 to 25 atmospheres in the presence of a nickel cyanide catalyst, in tetrahydrofurance as a solvent, the improvement which consists in incorporating 0.05 to 1% of an oxidizable secondary arylamine in the solvent, so as to avoid the presence of tetrahydrofurane peroxide during the reaction.

8. In the method of preparing cyclooctatetraene by condensing acetylene diluted with about one-half mol equivalent of an inert gas at a temperature of 50 to 140° C. and a total pressure of 10 to 25 atmospheres in the presence of a nickel cyanide catalyst, in tetrahydrofurane as a solvent, the improvement which consists in incorporating a sufficient amount of an oxidizable polyhydric phenol in the solvent, so as to avoid the presence of tetrahydrofurance peroxide during the reaction.

9. In the method of preparing cyclooctatetraene by condensing acetylene diluted with about one-half mol equivalent of an inert gas at a temperature of 50 to 140° C. and a total pressure of 10 to 25 atmospheres in the presence of a nickel cyanide catalyst, in tetrahydrofurane as a solvent, the improvement which consists in incorporating a sufficient amount of a dialkyl sulfite in the solvent, so as to avoid the presence of tetrahydrofurane peroxide during the reaction.

10. In the method of preparing cyclooctatetraene by condensing acetylene diluted with about one-half mol equivalent of propane at a temperature of about 90° C. and a total pressure of 10 to 25 atmospheres in the presence of a nickel cyanide catalyst, in tetrahydrofurane as a solvent, the improvement which consists in incorporating 0.05 to 1% of diphenylamine in the solvent, so as to avoid the presence of tetrahydrofurane peroxide during the reaction.

11. In the method of preparing cyclooctatetraene by condensing acetylene diluted with about one-half mol equivalent of propane at a temperature of about 90° C. and a total pressure of 10 to 25 atmospheres in the presence of a nickel cyanide catalyst, in tetrahydrofurane as a solvent, the improvement which consists in incorporating 0.05 to 1% of p-tertiary butyl catechol in the solvent, so as to avoid the presence of tetrahydrofurane peroxide during the reaction.

12. In the method of preparing cyclooctatetraene by condensing acetylene diluted with about one-half mol equivalent of propane at a temperature of about 90° C. and a total pressure of 10 to 25 atmospheres in the presence of a nickel cyanide catalyst, in tetrahydrofurane as a solvent, the improvement which consists in incorporating 0.05 to 1% of dimethyl sulfite in the solvent, so as to avoid the presence of tetrahydrofurane peroxide during the reaction.

CARL E. BARNES.

REFERENCES CITED

The following references are of record in the file of this patent:

Fiat Final Report 967, Feb. 28, 1947, pages 7 and 80 to 84.